Nov. 23, 1971  J. B. KRUGER  3,621,572
ELECTRIC ROTARY PINKING SHEARS
Filed May 18, 1970  2 Sheets-Sheet 1

James B. Kruger
Inventor
ATTY.

James B. Kruger
Inventor

United States Patent Office 3,621,572
Patented Nov. 23, 1971

3,621,572
ELECTRIC ROTARY PINKING SHEARS
James B. Kruger, Oxford, Conn., assignor to Scovill Manufacturing Company, Waterbury, Conn.
Filed May 18, 1970, Ser. No. 38,217
Int. Cl. B26b 17/00
U.S. Cl. 30—178                                 2 Claims

ABSTRACT OF THE DISCLOSURE

An electric rotary pinking shears has a pivoted anvil foot affording comfortable use positions and convenient storage means.

---

This invention relates to electric rotary pinking shears.

In the prior art, a number of patents show rotary pinking shears, but each one of them has the deficiency that it is awkward to hold and set down and is not structured for convenient usage or storage.

It is an object of the present invention to provide an inventive organization whereby a compact electric rotary pinking shears may be conveniently used and stored.

Further objects of the invention will be apparent from the following specification including the drawings wherein.

Figure 1:
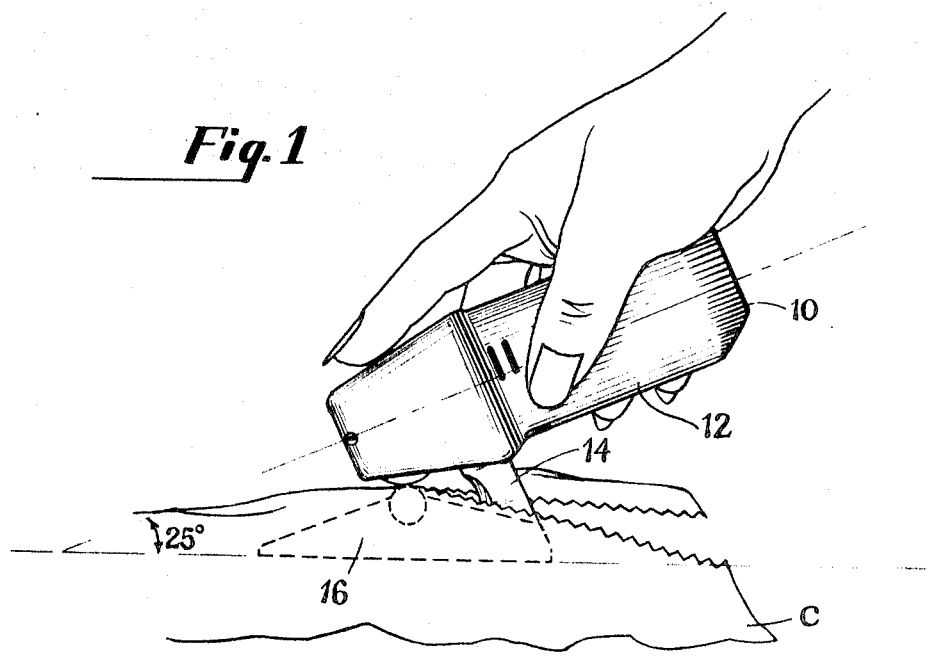
FIG. 1 is a side elevation showing a shears embodying the invention in use.

Referring more specifically to the drawings, in FIG. 1 a shears embodying the invention is generally designated 10. It comprises a housing 12 having disposed therein an electric motor preferably having its axis substantially coincident with the longitudinal axis of the housing. A leg 14 extends downward from the housing and mounts an anvil foot 16 having a flat, broad planar undersurface. For convenience in operation as shown in FIG. 1, the plane of the undersurface of the foot 16 when extended approaches an angle of approximately 25° as shown with the axis of the shears motor when the axis is extended to intercept the plane. This arrangement has been found extremely advantageous with respect to the comfort of the operator during the operation of the shears. In addition, the foot, being broad and reltaively heavy, provides a stable resting surface upon which the shears may sit during storage.

Figure 2:
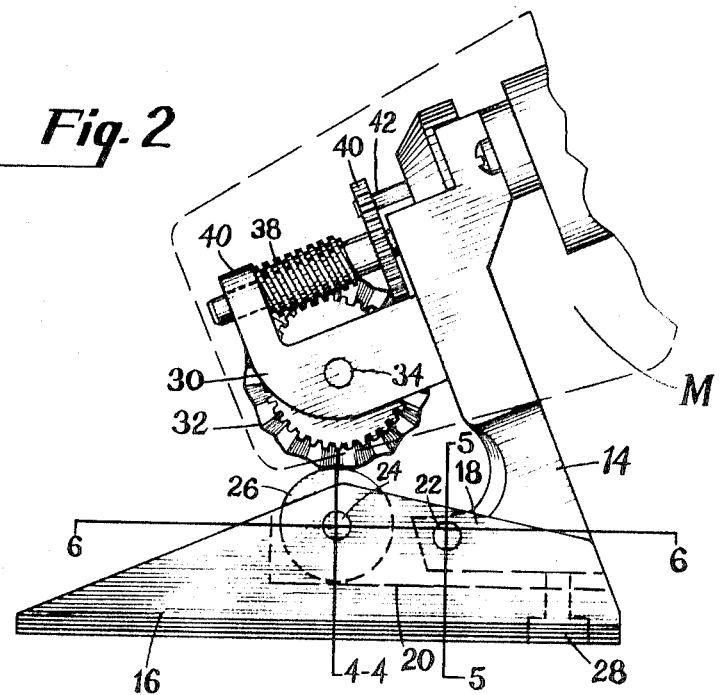
FIG. 2 is an enlarged view of the front end of the shears of FIG. 1 having the housing shown in phantom to reval the inner workings.
Figure 3:
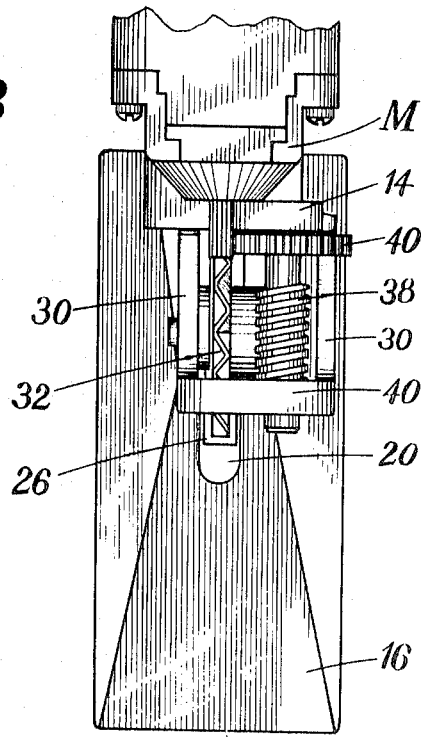
FIG. 3 is a top view of the front end of a shears as shown in FIG. 2.
Figure 4:
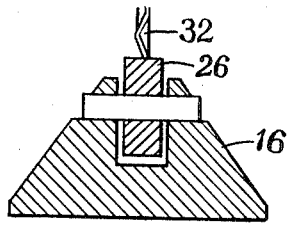
FIG. 4 is a fragmentary sectional view taken on the line 4—4 of FIG. 2.
Figure 5:
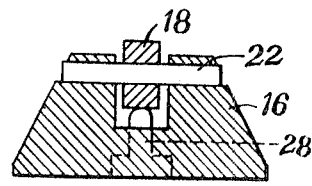
FIG. 5 is a sectional view taken on the line 5—5 of FIG. 2.
Figure 6:
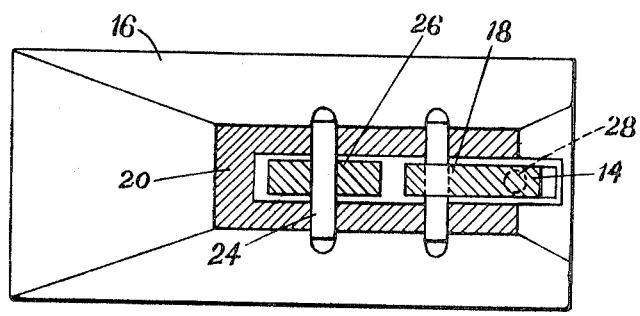
FIG. 6 is a sectional view taken on the line 6—6 of FIG. 2.

Referring to FIG. 2, the leg 14 is mounted on the front end of the motor M. The lower end of the leg 14 may be streamlined in its leading edge to part the cut material C away about the leg 14. The distal end of the leg 14 terminates in a forward finger 18 with a transverse opening therein. The foot 16 is formed with a longitudinal channel 20 in its upper end, and a pair of bores 22 and 24 extend transversely of the foot and intercept the channel 20. A pin extends through the bore 22 and the opening in the finger 18 to pivotally connect the leg and the foot.

An anvil wheel 26 is rotatably mounted in the channel 20 on a pin which extends through the bore 24. An adjusting screw 28 is threadedly engaged in an opening in the rear end of the foot and its upper end abuts the bottom of the leg 14, for adjusting the impingement pressure between the pinking wheel and the anvil wheel 26.

Extending outward from the upper end of the leg 14 are a pair of spaced arms 30 having aligned openings in which is journaled for rotation the pinking wheel 32. This wheel impinges on wheel 26 during the cutting operation. The pinking wheel shaft 34 also carries a worm wheel 36 which is engaged by a worm gear 38 journaled on a shaft which extends between the upper end of the leg 14 and an upward portion 40 of the arms 30. The drive shaft of the motor M terminates in a spur 42 which engages a pinion 44 on the shaft of the worm gear 38. Thus, the motor and the pinking wheel 32 are operatively connected. The motor M is supplied with power by cord means not hown.

During use, the motor housing 12 is normally held in the hand as shown in FIG. 1 with a disposition comfortably directed as the shears is moved along a tabletop cutting the cloth C. The leading edge of the foot 16 tapers gradually to reduce the disturbance of the cloth so that an accurate cut can be made. When it is desired ot store the shears, it is simply rested on its foot 16 on the storage shelf.

Convenient adjustment of the impingement pressure may be made by tightening or loosening the adjusting screw 28 so that the foot pivots about the pin attaching the foot 16 to the leg 14.

Variations of the structure shown will come within the appended claim language.

I claim:

1. An electric rotary pinking shears comprising
    (a) an electric motor;
    (b) a downwardly extending leg mounted on the front end of the motor adjacent the drive shaft thereof, the distal end of the leg having a forward finger with a transverse opening therein;
    (c) a relatively wide, heavy, anvil foot having a flat, broad undersurface with an upwardly tapered front, the upper end of the foot being formed with a longitudinal channel therein and a pair of bores spaced longitudinally about the foot, the bores each intercepting the channel;
    (d) an anvil wheel rotatably mounted in the channel on a pin extending through the bore closer to the forward end of the anvil foot;
    (e) a pivot pin pivotally connecting the foot and the leg by extending through the second bore and the transverse opening in the finger;
    (f) an adjusting screw threadedly engaging in an upward opening in the bottom of the foot and extending into the channel to engage the lower end of the leg on the side opposite the pivot pin from the anvil wheel;
    (g) a pinking wheel mounted on the upper end of the leg and operatively engaging the anvil wheel, and
    (h) drive means operatively associating the motor drive shaft and the pinking wheel to drive it, whereby the pressure of impingement of the two wheels may be regulated by adjusting the screw and the foot serves as a stand to support the shears during and after use.

2. A shears as described in claim 1 wherein the angle between the plane of the bottom of the foot and the axis of the motor, if the axis line is extended, approaches 25°.

References Cited

UNITED STATES PATENTS

| | | | |
|---|---|---|---|
| 1,796,463 | 3/1931 | Kaltenbach | 30—240 |
| 1,884,377 | 10/1932 | Temple | 30—265 |
| 2,285,249 | 6/1942 | Barentzen | 30—265 |
| 2,578,346 | 12/1951 | Florian | 30—178 |
| 2,861,340 | 11/1958 | Hazzard | 30—178 |

THERON E. CONDON, Primary Examiner

J. C. PETERS, Assistant Examiner